W. DICKINSON.
Car Wheel.
No. 58,786.                        Patented Oct. 16, 1866.
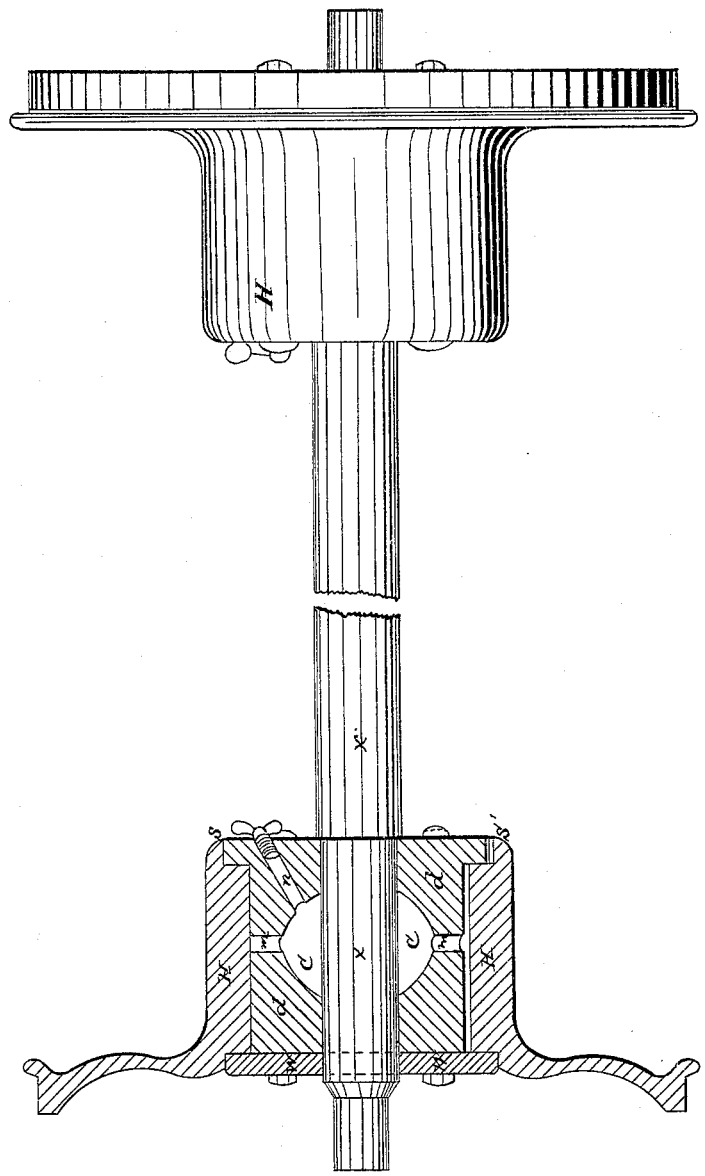
Witnesses:
Inventor:
Wallace Dickinson

UNITED STATES PATENT OFFICE.

WALLACE DICKINSON, OF BROOKLYN, NEW YORK.

IMPROVED CAR-WHEEL.

Specification forming part of Letters Patent No. 58,786, dated October 16, 1866.

*To all whom it may concern:*

Be it known that I, WALLACE DICKINSON, of the city of Brooklyn, in the county of Kings and State of New York, have invented a new and useful Improvement in Compound Concentric Railroad-Car Wheels; and I hereby declare the following to be a full, clear, and exact description thereof, reference being had to the accompanying drawings, which are lettered to correspond with the specification, and form a part thereof.

Figure 1, letter A, is a vertical section of a railroad-car wheel, having my improvement therein. Fig. 2 is an exterior view of the same wheel, showing the elongated hub H.

My invention does not consist in constructing a car-wheel of any number of concentric parts, as that is well known; but my invention does consist in the fashioning of the bush $d$ so that it constitutes an oil or lubricating chamber, $c$, with diagonal ingress-opening $n$ and egress-openings $m$ $m'$, through which the oil is caused to pass by centrifugal force to the inner surface or bearing-journal of the hub H; also, securing the vertical washer W on the outer face of the wheel and hub H, at the same time protecting the vertical joints against the injurious effects of the weather and dirt by the longitudinal flanges $s$, formed by extending the hub H at the back end thereof. The hub H projects sufficiently far over the washer W at the outer face of the wheel to protect the vertical joint thereof in a similar manner.

The superiority of the above arrangement over all other concentric railroad-car wheels that are in common use is the manner of oiling the journal of the elongated hub H by centrifugal force from the lubricating-chamber $c$, which is formed by coring out the bush $d$ around the axle $x$, this chamber being filled through the diagonal opening $n$, which is kept closed by means of a screw-plug, P; hence the oil must be flung out through the openings $m$ $m'$ into and around the journal of the elongated hub H.

Secondly, by elongating the hub H the wheel is better protected against any lateral strain; hence I believe it to be better adapted for railroad purposes than any other compound concentric wheel ever brought before the public.

It is well known in the mechanic arts the bearings of a revolving metallic body around a metallic shaft or journal at great velocity must become heated, and finally amalgamate, unless they are properly oiled; and any oil that is poured into the vertical joints around the hub H from the outside thereof would be thrown out instead of into the journal by the motion of the wheel and axes.

Lastly, the washer W is secured by any suitable device to the outside or front of the wheel, and not at the back or inside thereof, by which means I am enabled, in case of breakage of the washer W, to replace it without disturbing the wheel. Therefore,

What I claim as new and useful, and what I wish to secure by Letters Patent of the United States, is—

The elongated hub H, having flanges $s$ $s'$, provided with a bush, $d$, having cavity C and openings $m$ $m'$ $n$, and washer W, all constructed and arranged substantially as described, and for the purpose set forth, and shown in the accompanying drawings.

WALLACE DICKINSON.

Witnesses:
J. P. MCLEAN,
E. V. N. HITCHCOCK.